United States Patent
Lawrence

(10) Patent No.: US 7,958,027 B2
(45) Date of Patent: Jun. 7, 2011

(54) SYSTEMS AND METHODS FOR MANAGING RISK ASSOCIATED WITH A GEO-POLITICAL AREA

(75) Inventor: David Lawrence, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 1954 days.

(21) Appl. No.: 10/459,655

(22) Filed: Jun. 11, 2003

(65) Prior Publication Data

US 2004/0006533 A1 Jan. 8, 2004

Related U.S. Application Data

(63) Continuation-in-part of application No. 10/074,584, filed on Feb. 12, 2002, now abandoned, which is a continuation-in-part of application No. 10/021,124, filed on Oct. 30, 2001, now abandoned, which is a continuation-in-part of application No. 09/812,627, filed on Mar. 20, 2001.

(60) Provisional application No. 60/387,849, filed on Jun. 11, 2002.

(51) Int. Cl.
*G06Q 40/00* (2006.01)
(52) U.S. Cl. ......... 705/35; 705/36 R; 705/36 T; 705/37; 705/38
(58) Field of Classification Search ............. 705/35–38
See application file for complete search history.

(56) References Cited

U.S. PATENT DOCUMENTS

| | | |
|---|---|---|
| 4,326,259 A | 4/1982 | Cooper et al. |
| 4,346,442 A | 8/1982 | Musmanno |
| 4,376,978 A | 3/1983 | Musmanno |
| 4,597,046 A | 6/1986 | Musmanno et al. |
| 4,718,009 A | 1/1988 | Cuervo |
| 4,727,243 A | 2/1988 | Savar |
| 4,734,564 A | 3/1988 | Boston et al. |
| 4,736,294 A | 4/1988 | Gill et al. |

(Continued)

FOREIGN PATENT DOCUMENTS

EP 1 137 209 A2 9/2001

(Continued)

OTHER PUBLICATIONS

"Specially designated Who? A Primer on OFAC Compliance" ABA Bank Compliance Mar./Apr. 1996, pp. 29-36.*

(Continued)

*Primary Examiner* — Narayanswamy Subramanian
(74) *Attorney, Agent, or Firm* — Chadbourne & Parke LLP; John A. Squires

(57) ABSTRACT

Methods and systems are presented for managing Risks, including regulatory and reputational risk. The methods can be implemented in a computer and include receiving data descriptive of informational artifacts with content related to at least one of reputational and regulatory risk into the computer system. The computer system can have one or more geo-political areas defined within it. The computer system can also receive data descriptive of details of a financial transaction, wherein the details include an indication of at least one geopolitical area associated with the financial transaction. At least one informational artifact related to at least one of reputational and regulatory risk can be associated with the at least one geopolitical area associated with the financial transaction and the computer system can generate a report comprising data descriptive of the informational artifacts associated with the at least one geopolitical area associated with the financial transaction.

17 Claims, 11 Drawing Sheets

U.S. PATENT DOCUMENTS

| Patent No. | Date | Inventor(s) | Ref |
|---|---|---|---|
| 4,774,663 A | 9/1988 | Musmanno et al. | |
| 4,774,664 A | 9/1988 | Campbell et al. | |
| 4,812,628 A | 3/1989 | Boston et al. | |
| 4,868,866 A | 9/1989 | Williams, Jr. | |
| 4,914,587 A | 4/1990 | Clouse | |
| 4,953,085 A | 8/1990 | Atkins | |
| 4,989,141 A | 1/1991 | Lyons et al. | |
| 5,025,138 A | 6/1991 | Cuervo | |
| 5,038,284 A | 8/1991 | Kramer | |
| 5,068,888 A | 11/1991 | Scherk et al. | |
| 5,161,103 A | 11/1992 | Kosaka et al. | |
| 5,177,342 A | 1/1993 | Adams | |
| 5,210,687 A | 5/1993 | Wolfberg et al. | |
| 5,239,462 A | 8/1993 | Jones et al. | |
| 5,274,547 A | 12/1993 | Zoffel et al. | |
| 5,323,315 A | 6/1994 | Highbloom | |
| 5,347,632 A | 9/1994 | Filepp et al. | |
| 5,398,300 A | 3/1995 | Levey | |
| 5,432,542 A * | 7/1995 | Thibadeau et al. | 725/35 |
| 5,444,819 A | 8/1995 | Negishi | |
| 5,448,047 A | 9/1995 | Nair et al. | |
| 5,457,305 A | 10/1995 | Akel et al. | |
| 5,557,518 A | 9/1996 | Rosen | |
| 5,565,909 A * | 10/1996 | Thibadeau et al. | 725/35 |
| 5,627,886 A | 5/1997 | Bowman | |
| 5,649,116 A | 7/1997 | McCoy et al. | |
| 5,679,938 A | 10/1997 | Templeton et al. | |
| 5,679,940 A | 10/1997 | Templeton et al. | |
| 5,696,907 A | 12/1997 | Tom | |
| 5,704,045 A | 12/1997 | King et al. | |
| 5,717,923 A | 2/1998 | Dedrick | |
| 5,732,397 A | 3/1998 | DeTore et al. | |
| 5,732,400 A | 3/1998 | Mandler et al. | |
| 5,787,402 A | 7/1998 | Potter et al. | |
| 5,790,639 A | 8/1998 | Ranalli et al. | |
| 5,797,133 A | 8/1998 | Jones et al. | |
| 5,819,226 A | 10/1998 | Gopinathan et al. | |
| 5,819,236 A | 10/1998 | Josephson | |
| 5,852,812 A | 12/1998 | Reeder | |
| 5,875,431 A | 2/1999 | Heckman et al. | |
| 5,878,400 A | 3/1999 | Carter, III | |
| 5,884,289 A | 3/1999 | Anderson et al. | |
| 5,903,882 A | 5/1999 | Asay et al. | |
| 5,940,843 A | 8/1999 | Zucknovich et al. | |
| 5,963,923 A | 10/1999 | Garber | |
| 5,991,743 A * | 11/1999 | Irving et al. | 705/36 R |
| 6,014,228 A | 1/2000 | Castro | |
| 6,016,963 A | 1/2000 | Ezawa et al. | |
| 6,018,723 A | 1/2000 | Siegel et al. | |
| 6,021,397 A | 2/2000 | Jones et al. | |
| 6,078,904 A | 6/2000 | Rebane | |
| 6,078,905 A | 6/2000 | Pich-LeWinter | |
| 6,085,175 A | 7/2000 | Gugel et al. | |
| 6,119,103 A * | 9/2000 | Basch et al. | 705/35 |
| 6,148,301 A | 11/2000 | Rosenthal | |
| 6,199,073 B1 | 3/2001 | Peairs et al. | |
| 6,205,433 B1 | 3/2001 | Boesch et al. | |
| 6,219,805 B1 | 4/2001 | Jones et al. | |
| 6,246,996 B1 | 6/2001 | Stein | |
| 6,249,770 B1 | 6/2001 | Erwin et al. | |
| 6,278,983 B1 | 8/2001 | Ball | |
| 6,289,320 B1 | 9/2001 | Drummond et al. | |
| 6,304,973 B1 | 10/2001 | Williams | |
| 6,317,727 B1 | 11/2001 | May | 705/37 |
| 6,321,212 B1 | 11/2001 | Lange | 705/37 |
| 6,330,546 B1 | 12/2001 | Gopinathan et al. | |
| 6,341,267 B1 | 1/2002 | Taub | |
| 6,347,307 B1 | 2/2002 | Sandhu et al. | |
| 6,393,423 B1 | 5/2002 | Goedken | |
| 6,415,271 B1 | 7/2002 | Turk et al. | |
| 6,456,984 B1 | 9/2002 | Demoff et al. | |
| 6,516,056 B1 * | 2/2003 | Justice et al. | 379/145 |
| 6,658,393 B1 * | 12/2003 | Basch et al. | 705/38 |
| 6,714,918 B2 * | 3/2004 | Hillmer et al. | 705/18 |
| 6,738,760 B1 | 5/2004 | Krachman | |
| 6,785,661 B1 | 8/2004 | Mandler et al. | |
| 7,006,992 B1 | 2/2006 | Packwood | |
| 7,181,428 B2 | 2/2007 | Lawrence | |
| 7,209,889 B1 * | 4/2007 | Whitfield | 705/14 |
| 7,231,353 B1 * | 6/2007 | Goyal | 705/1 |
| 7,389,265 B2 * | 6/2008 | Lawrence et al. | 705/38 |
| 7,403,922 B1 * | 7/2008 | Lewis et al. | 705/38 |
| 7,426,492 B1 | 9/2008 | Bishop et al. | |
| 7,451,114 B1 | 11/2008 | Matsuda et al. | |
| 7,620,556 B1 * | 11/2009 | Ross | 705/1 |
| 7,657,482 B1 * | 2/2010 | Shirey et al. | 705/38 |
| 7,708,200 B2 * | 5/2010 | Helsper et al. | 235/383 |
| 7,752,154 B2 * | 7/2010 | Friedlander et al. | 706/47 |
| 2001/0001014 A1 * | 5/2001 | Akins et al. | 380/241 |
| 2001/0011243 A1 | 8/2001 | Dembo et al. | |
| 2001/0027388 A1 | 10/2001 | Beverina et al. | |
| 2001/0027389 A1 | 10/2001 | Beverina et al. | |
| 2001/0047279 A1 | 11/2001 | Gargone | |
| 2001/0049651 A1 | 12/2001 | Selleck | |
| 2001/0049793 A1 | 12/2001 | Sugimoto | |
| 2001/0054020 A1 | 12/2001 | Barth et al. | |
| 2001/0056359 A1 | 12/2001 | Abreu | |
| 2002/0016854 A1 | 2/2002 | Hirasawa et al. | |
| 2002/0019804 A1 | 2/2002 | Sutton | |
| 2002/0032635 A1 * | 3/2002 | Harris et al. | 705/37 |
| 2002/0032646 A1 | 3/2002 | Sweeney et al. | |
| 2002/0046053 A1 | 4/2002 | Hare et al. | |
| 2002/0062438 A1 | 5/2002 | Asay et al. | |
| 2002/0087454 A1 | 7/2002 | Calo et al. | |
| 2002/0087455 A1 | 7/2002 | Tsagarakis et al. | |
| 2002/0091635 A1 | 7/2002 | Dilip et al. | |
| 2002/0091706 A1 | 7/2002 | Anderson et al. | |
| 2002/0099640 A1 | 7/2002 | Lange | |
| 2002/0103747 A1 | 8/2002 | Lawrence | |
| 2002/0103852 A1 * | 8/2002 | Pushka | 709/203 |
| 2002/0107767 A1 * | 8/2002 | McClair et al. | 705/35 |
| 2002/0111890 A1 | 8/2002 | Sloan et al. | |
| 2002/0138371 A1 | 9/2002 | Lawrence et al. | |
| 2002/0138407 A1 | 9/2002 | Lawrence et al. | |
| 2002/0138408 A1 | 9/2002 | Lawrence | |
| 2002/0143562 A1 | 10/2002 | Lawrence | |
| 2002/0188861 A1 | 12/2002 | Townsend | |
| 2003/0023543 A1 * | 1/2003 | Gunewardena et al. | 705/38 |
| 2003/0065942 A1 | 4/2003 | Lineman et al. | |
| 2003/0066872 A1 * | 4/2003 | McClure et al. | 235/51 |
| 2003/0069742 A1 | 4/2003 | Lawrence | |
| 2003/0069894 A1 | 4/2003 | Colter et al. | |
| 2003/0074272 A1 | 4/2003 | Knegendorf et al. | |
| 2003/0074310 A1 | 4/2003 | Grovit et al. | |
| 2003/0167177 A1 | 9/2003 | Branch | |
| 2004/0193532 A1 * | 9/2004 | Lawrence | 705/37 |
| 2005/0086090 A1 | 4/2005 | Abrahams et al. | |
| 2006/0218651 A1 * | 9/2006 | Ginter et al. | 726/27 |
| 2008/0021835 A1 * | 1/2008 | Ginter et al. | 705/51 |
| 2008/0319922 A1 * | 12/2008 | Lawrence et al. | 705/36 R |
| 2009/0299896 A1 * | 12/2009 | Zhang et al. | 705/38 |
| 2009/0319420 A1 * | 12/2009 | Sanchez et al. | 705/38 |

FOREIGN PATENT DOCUMENTS

| | | |
|---|---|---|
| EP | 1 143 365 A2 | 10/2001 |
| JP | 2000020618 A | 1/2000 |
| JP | 2003050896 A | 2/2003 |
| WO | WO 00/75836 | 12/2000 |
| WO | WO 01/55885 | 8/2001 |

OTHER PUBLICATIONS

"OFAC Compliance: A Perspective for Community Banks", ABA Bank Compliance Nov./Dec. 1998, pp. 39-48.*

"Commentary: Foreign Assets Control Regulations: The Countries Aren't Enough", Letter of Credit Update, Mar. 1996, pp. 23-27.*

Int'l Search Report from PCT/US03/18430 dated Dec. 22, 2003.

"Enterprise Anti-Money Laundering Product Specification." *Mantas*, 2001.

"Firms Consider Pact to Track Terror Money." Wall Street Journal, Nov. 26, 2001. cited by other.

"Five Ways to Reduce Risk with Neutral Networks." *Credit Risk Management Report*, vol. 3, Jun. 27, 1993.

"Transforming Discovery Into Opportunity"; "Key Personnel Bios"; "Frequently Asked Questions"; *Mantas*. Mantas, Inc., Announces Funding and Management Team:, *Mantas*, Jun. 4, 2001. "Safeguard and SRA Partner to Launch Mantas, Inc.", *Mantas*,. "Knowledge Discovery Platform"; "Money Laundering Detection for Banks"; "Fraud and Money Laundering Detection for Securities Firms"; "Best Execution"; "Equities Trading Compliance", *Mantas*.

Aguais, Scott D. "It's the Economy." *Credit Card Management*, vol. 5, 1993, pp. 58-60.

Banasiak, Michael, "Don't be Out-Scored by Your Competition", *Credit and Financial Management Review*, 2nd Quarter 2000.

Barrett, Jennifer, "Banking on Software Solutions", *Newsweek Web*, Jun. 12, 2002.

Caudill, Maureen et al., "Naturally Intelligent Systems." *The MIT Press*, 1990.

Chandler, Gary "Credit Scoring; A Feasibility Study." *Executive*, 1985.

Everest-Hill, Deborah "Automating Risk Assessment." *The Internal Auditor*, vol. 56, Jun. 1999, pp. 23-25.

Grafton, David. "Analysing Customers With Behavioural Modelling." *Credit Control*, vol. 17, 1996, pp. 27-31.

Gullo, Karen "Neutral Nets Versus Card Fraud; Chase's Software Learns to Detect Potential Crime." *The American Banker*, Feb. 2, 1990.

Healy, Thomas J. "The New Science of Borrower Behavior." *Factiva*, Feb. 1, 1998.

Hicks M., "What, me spam?" Good intentions alone aren't enough to avoid alienating customers, eWeek Sep. 3, 2001, retrieved from Dialog, Dialog No. 08984028, see abstract.

Higgins, Kevin T. "Retention by the Numbers." *Credit Card Management*, vol. S, 1993, pp. 52-S6.

Leonard, Kevin J. and William J. Banks. "Automating the Credit Decision Process." *Journal of Retail Banking*, vol. 16, 1994, p. 39.

McLure, Leslie "Taking the Risk Out of Transactions." *Factiva*, Mar. 1, 1994.

Power, Stephen "Background Checks Await Fliers." *The Wall Street Journal*, Jun. 7, 2002.

Purcell, Lea "Roping in Risk." *Factiva*, May 1, 1994.

Quinn, Jane Bryant "Credit Card Issuers; Keeping a Closer Watch on How You Pay Bills." *Washington Post*, Apr. 25, 1988.

World-Check Search—Vladimir Gusinsky (Russia).

Int'l Search Report dated Feb. 3, 2003 for PCT/US02/07110.

Int'l Search Report dated Oct. 1, 2003 for PCT/US03/03994.

Int'l Search Report dated Jun. 24, 2004 for PCT/US03/018273.

\* cited by examiner

| GEOGRAPHIC LOCATION 702 | ARTIFACT 704 | SOURCE 706 | PARTICIPANT NAME 708 |
|---|---|---|---|
| STREET ADDRESS | OFAC LIST | BANK SECRECY ACT VIOLATION | JOHN DOE |
| STREET ADDRESS | KINGPIN LIST | CHECK FRAUD | OHMAR ATTA |
| TAX MAP NUMBER | FATF LIST | COMPUTER INTRUSION | GEORGE SMITH |
| GPS LOCATION | GOVT. RECORDS | MONEY LAUNDERING | XAO CHIN LI |
| LAT/LONG. COORDINATE | 911 RECORDS | SMUGGLING | ARMANDO GUTIEREZ |

FIG. 7

| GOVERNMENT LIST 802 | MEDIA PUBLICATION 804 | GEOGRAPHIC DESIGNATION 806 | PARTICIPANT NAME |
|---|---|---|---|
| FATF | Reuters | ADDRESS | JOHN DOE |
| OFAC | News Corp. | ADDRESS | OHMAR ATTA |
| GL-103 | Financial TImes | DESIGNATION | GEORGE SMITH |
| GL104 | Wall Street Journal | DESIGNATION | XAO CHIN LI |
| GL105 | Asociated Press | DESIGNATION | ARMANDO GUTIEREZ |

SYSTEMS AND METHODS FOR MANAGING RISK ASSOCIATED WITH A GEO-POLITICAL AREA

CROSS REFERENCE TO RELATED APPLICATIONS

This application claims the benefit of the filing date of U.S. Provisional application No. 60/387,849 entitled "Jurisdiction Related Fund Transfer Risk Management", filed Jun. 11, 2002. This application is a continuation-in-part of a prior application entitled "Risk Management Clearinghouse", filed Feb. 12, 2002 now abandoned, and bearing the Ser. No. 10/074,584 which is a continuation-in-part of a prior application also entitled "Risk Management Clearinghouse" filed Oct. 30, 2001 now abandoned, and bearing the Ser. No. 10/021,124, which is also a continuation-in-part of a prior application entitled "Automated Global Risk Management" filed Mar. 20, 2001, and bearing the Ser. No. 09/812,627, all of which are relied upon and incorporated by reference.

FIELD

The present invention relates to computerized database and communication systems. In particular, the present invention relates to systems and methods to facilitate managing risk associated with a geo-political area.

BACKGROUND

World events and surreptitious activities have increased the need to "Know Your Customer" in order to minimize risks associated with conducting business with, or on behalf of, a particular person or organization. The present invention focuses on ascertaining and managing risks associated with a geo-political area, such as a country, region or a street address.

As money-laundering and related concerns have become increasingly important public policy concerns, regulators have attempted to address these issues by imposing increasing formal and informal obligations upon Risk Bearing Institutions. Government regulations authorize a broad regime of record-keeping and regulatory reporting obligations on covered Risk Bearing Institutions as a tool for the federal government to use to fight drug trafficking, money laundering, and other crimes. The regulations may require Risk Bearing Institutions to file currency and monetary instrument reports and to maintain certain records for possible use in tax, criminal and regulatory proceedings. Such a body of regulation is designed chiefly to assist law enforcement authorities in detecting when criminals are using banks and other Risk Bearing Institutions as intermediaries for, or to hide the transfer of funds derived from, criminal activity.

Obligations include those imposed by the Department of the Treasury and the federal banking regulators which adopted suspicious activity report ("SAR") regulations. SAR regulations require that Risk Bearing Institutions file SARs whenever an institution detects a known or suspected violation of federal law, or a suspicious transaction related to a money laundering activity or a violation of the Bank Secrecy Act ("BSA"). The regulations can impose a variety of reporting obligations on Risk Bearing Institutions. Perhaps most broadly relevant for the present invention, current regulations require a Risk Bearing Institution to report transaction which aggregate to $5,000 and which involve potential money laundering or violations if the institution, knows, suspects, or has reason to suspect that the transaction involves funds from illegal activities, is designed to disguise such funds, has no business or legitimate purpose, or is simply not the sort of transaction in which the particular customer would normally be expected to engage, and the institution knows of no reasonable explanation for the transaction after examining the available facts.

Federal regulators have made clear that the practical effect of these requirements is that Risk Bearing Institutions are subject to significant obligations to "know" their customer and to engage in adequate monitoring of transactions.

Bank and non-bank Risk Bearing Institutions, including: investment banks; merchant banks; commercial banks; securities firms, including broker dealers securities and commodities trading firms; asset management companies, hedge funds, mutual funds, credit rating funds, securities exchanges and bourses, institutional and individual investors, law firms, accounting firms, auditing firms, any institution the business of which is engaging in financial activities as described in section 4(k) of the Bank Holding Act of 1956, and other entities subject to legal and regulatory compliance obligations with respect to money laundering, fraud, corruption, terrorism, organized crime, regulatory and suspicious activity reporting, sanctions, embargoes and other regulatory risks and associated obligations, hereinafter collectively referred to as "Risk Bearing Institutions," typically have few resources available to them to assist in the identification of present or potential risks associated with business transactions.

Generally, compliance officers and other Risk Bearing Institution personnel have few resources available to assist them with the identification of present or potential global risks associated with a particular investment or trading transaction. Risks can be multifaceted and far reaching. The amount of information that needs to be considered to evaluate whether an international entity poses a significant risk or should otherwise be restricted, is substantial.

However, Risk Bearing Institutions do not have available a mechanism which can provide real time assistance to assess a risk factor associated with an international transaction, or otherwise qualitatively manage such risk. In the event of investment problems, it is often difficult to quantify to regulatory bodies, shareholders, newspapers and/or other interested parties, the diligence exercised by the Risk Bearing Institution to properly identify and respond to risk factors. Absent a means to quantify good business practices and diligent efforts to contain risk, a Risk Bearing Institution may appear to be negligent in some respect.

SUMMARY

To alleviate problems inherent in the prior art, the present invention introduces systems and methods to facilitate ascertaining and managing Risks associated with a geo-political area.

According to some embodiments, methods and systems are presented for managing Risks, including regulatory and reputational risk. The methods can be implemented in a computer and include receiving data descriptive of informational artifacts with content related to at least one of reputational and regulatory risk into the computer system. The computer system can have one or more geo-political areas defined within it. The computer system can also receive data descriptive of details of a financial transaction, wherein the details include an indication of at least one geopolitical area associated with the financial transaction. At least one informational artifact related to at least one of reputational and regulatory risk can be associated with the at least one geopolitical area associated with the financial transaction and the computer system can generate a report comprising data descriptive of the informational artifacts associated with the at least one geopolitical area associated with the financial transaction.

Some embodiments can include a computer system which receives data descriptive of informational artifacts with content related to Risks, such as for example, at least one of reputational and regulatory risk. The computer system can have one or more geo-political areas defined within it and can associate one or more of the informational artifacts with the one or more defined geo-political areas. The computer system can also receive details of a financial transaction, wherein the details include an indication of at least one geopolitical area associated with the financial transaction. One or more informational artifacts related to Risk, such as reputational and regulatory Risk can be associated with the at least one geo-political area associated with the financial transaction. A report can be generated which includes data descriptive of the informational artifacts associated with the at least one geo-political area associated with the financial transaction.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 7 is a tabular representation of a portion of a geo-political area information database according to some embodiments of the present invention.

DETAILED DESCRIPTION

Figure 1A:
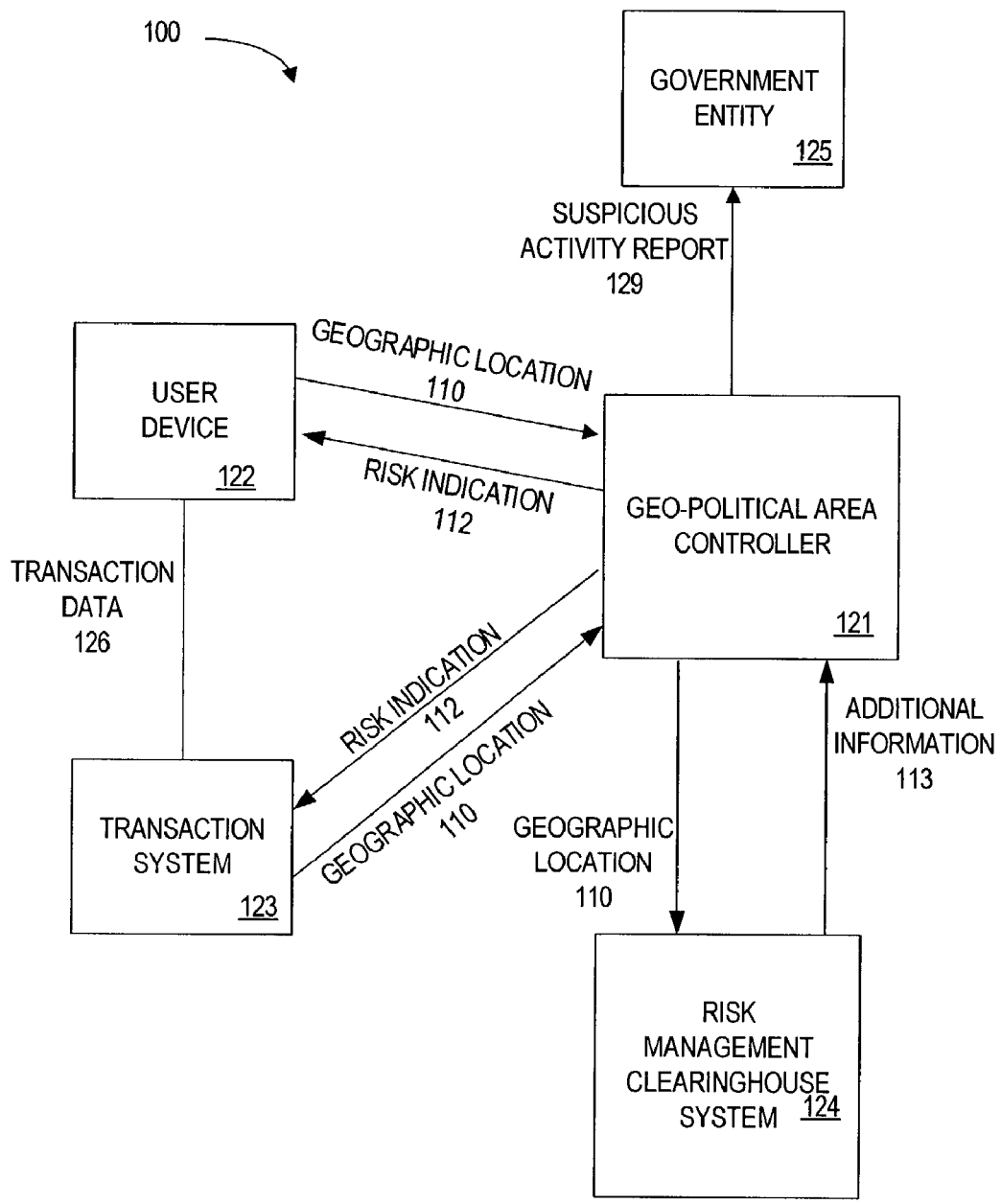
FIG. 1A is a block diagram overview of some implementations of the present invention.

The present invention provides methods and systems implemented by a computer system to assess and manage risk associated with one or more geographic areas. In some embodiments, the present invention can be used in conjunction with a Risk Management Clearinghouse for associating informational artifacts with identified risk criteria.

A computerized system gathers and stores data descriptive of informational artifacts in a database or other data storing structure and relates the information to risk criteria associated with a jurisdiction or other geo-political area. A user can supply details of a financial transaction to the database to assess risk associated with the financial transaction. The computerized system relates the details supplied with specified risk criteria and informational artifacts in order to generate a report that correlates informational artifacts with risk criteria and the details of the financial transaction. In some embodiments, the report can be utilized by a Risk Bearing Institution to assess Risks associated with a particular financial transaction, or to assess aggregate Risks faced by the Risk Bearing Institution. Other embodiments can include an assessment from a user's perspective seeking to assess potential risk with a particular financial transaction, with a particular subject matter of a Financial Transaction, with a Risk Bearing Institution involved or other subject matter.

Risks associated with a Financial Transaction that involves international jurisdictions can be greatly increased due to the difficulty in gathering and accessing pertinent data on a basis timely to managing risk associated with the transaction. As part of due diligence associated with arranging, providing or conducting a Financial Transaction, there is a growing importance for a Risk Bearing Institution to "Know Their Customer" including whether a Transaction Participant is contained on a list of restricted persons published or maintained by a law enforcement agency, the Office of Foreign Access Control (OFAC), the Treasury Office or other government or industry organization or entity involved with regulatory tasks or containment of Risks.

In some embodiments, a rating, such as a risk quotient can be generated to readily indicate a level of Risk associated with a particular financial transaction or Transaction Participant. The risk quotient can be based upon a weighted algorithm applied to the Risk criteria and informational artifacts. The risk quotient can be made available on a periodic basis, on demand, in real time, in response to an event such as executing a Financial Transaction, or according to some other request. Some embodiments can also include generation of suggested actions commensurate with ascertained Risks.

DEFINITIONS

To aid in the description of the present invention, the following definitions can apply to terms utilized throughout this document:

Financial Transaction: a Financial transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

Geographic Designation: Geographic Designation refers to a political or geographic indication of an area of the globe. As such a Geographic Designation can include any indication of a geographic area, such as, for example: a street address, a mailing address, a global positioning system designation, a longitude and latitude coordinate, a tax map number, or other description of a geo-political area, a national boundary; a jurisdictional boundary; an area defined by a geographic attribute, such as, for example, the great lakes districts in Africa, or the diamond corridor; or other means to indicate an area on Earth.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Risk Bearing Institution: a Risk Bearing Institution refers to any person, entity, company, corporation or statutory "person" in the business of providing Financial transactions. As such a Risk Bearing Institution can include, for example: a securities broker, a retail bank, a commercial bank, investment and merchant bank, private equity firm, asset management company, a mutual fund company, a hedge fund firm, insurance company, a credit card issuer, retail or commercial financier, a securities exchange, a regulator, a money transfer agency, bourse, an institutional or individual investor, an auditing firm, a law firm, any institution the business of which is engaging in financial activities as described in section 4(k) of the Bank Holding Act of 1956 or other entity or institution who may be involved with a financial transaction or other business transaction or any entity subject to legal and regulatory compliance obligations with respect to money laundering, fraud, corruption, terrorism, organized crime, regulatory and suspicious activity reporting, sanctions, embargoes and other regulatory risks and associated obligations.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: Ser. No. 10/074, 584 entitled "Risk Management Clearinghouse" filed Feb. 12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Transaction Participant: Transaction Participant refers to a person who will partake in a Financial transaction.

Elements

Referring now to FIG. 1A, a block diagram including elements of some embodiments of the present invention is illustrated. A Geo-political area Risk Controller (GLR Controller) 101, receives data descriptive of one or more geo-political areas 110 from a user 122. The GLR Controller 121 can include a computerized system programmed or otherwise functioning to perform the various inventive functions described herein. A detailed description of some embodiments of a GLR Controller 121 are disclosed herein with particular implementations discussed in relation to FIGS. 3 and 4.

An user device 122 can be any electronic communications device that enables a human to interact with the GPA Controller 121. The user can transmit the data descriptive of a geo-political area to the GPA Controller 121 alone or combined with other data containing details relating to a financial transaction. For, example, as part of a standard processing procedure, a user can input data 126 that is related to the execution of a financial transaction into a user device 122. The user device 22 can then transmit, or otherwise convey the transaction data to a transaction system 123 which will process the transaction. The user device 22 can also convey a portion of the transaction data that is descriptive of a geo-political area 110 to the GLR Controller 121. In some embodiments, the GLR Controller can receive the data descriptive of one or more geo-political areas 110 directly from the transaction system 123.

Some embodiments can also include the GPA Controller 121 receiving additional information from a RMC 124. The RMC can in supply data gathered from a number of sources and structured according to risk criteria. The data from the RMC can include data gathered from numerous sources, such as, for example: a list generated by the Office of Foreign Assets Control (OFAC) 401, including their sanction and embargo list; a list generated by the U.S. Commerce Department 402; a list of international "kingpins" generated by the U.S. White House 403; a list generated by a foreign counterpart to a U.S. entity 404; U.S. regulatory actions 405; or other information source 407 such as a foreign government, US adverse business-related media reports, US state regulatory enforcement actions, international regulatory enforcement actions, international adverse business-related media reports, a list of terrorist organizations, a list of politically connected individuals and military leaders, a list of U.S. and international organized crime members and affiliates, or a list of recognized high risk countries. Court records or other references relating to fraud, bankruptcy, professional reprimands or a rescission of a right to practice, suspension from professional ranks, disbarment, prison records or other sources of suspect behavior can also be included as a source of informational data and artifacts, as can public documents and publications such as newspapers, periodicals, news feeds, internet postings, government filings or other source of information. Many embodiments can also include information data sources which are various foreign equivalents to those listed above or any other international source.

Data relating to informational artifacts 106 can be varied according to a source or type of data and generally include any data which can be presented as humanly discernable information. It can also include actual copies of artifacts or portions thereof, such as, for example, a copy of a government report, a news article, a document, a transcript, a cite, a court record, or other article. Embodiments can include data relating to informational artifacts that is periodically updated, constantly updated in real time, or updated in response to a request.

The GLR Controller 121 can transmit the data descriptive of one or more geo-political areas 110 to the RMC 124. The RMC 124 can determine which data relating to informational artifacts gathered by the RMC 124 are associated with the one or more geo-political area related risk criteria and the information descriptive of a financial transaction 107 and generate a report and/or a suggested action based upon the data received. The data relating to informational artifacts 106 can be associated with a risk criteria or other subject with programmed data association techniques, such as, for example, keyword search, fuzzy logic, artificial intelligence programs, full text, numerical value, financial value, coded entry or other well known or proprietary forms of data manipulation.

Output from the GLR Controller 121 can include a risk indication 112 which can be transmitted to one or both of the user device 122 and the transaction system 123. The risk indication can include a risk quotient or other quantitative value of an amount of risk associated the transaction, an instruction, a suggested action or other indicator.

Some embodiments can include other risk indications 112 output by the GPA Controller 121 such as, for example, a report containing data descriptive of a geo-political area 110, risk criteria and informational artifacts. Reports can generated that are conducive to the needs of a particular recipient or the report. For example, a report can be generated for a compliance department that includes risk indications for multiple transactions, or for a market participant which relate to a particular transaction or deal. Embodiments can therefore include reports generated for a graphical user interface, hardcopy, facsimile, e-mail, messaging or other communication with any humanly or machine discernable data and/or artifacts. In some embodiments, output can include transmitting the risk criteria related data to a designated recipient in any humanly or machine discernable data and/or artifacts.

A user, such as a Risk Bearing Institution, will often be closely regulated. As a result Risk Bearing Institutions are exposed to significant risks from their obligations of compliance with the law and to prevent, detect and, at times, report potential violations of laws, regulations and industry rules ("laws"). Amongst other usefulness, reports generated by the GPA Controller 121 and/or the RMC 124 can be utilized to address Risks that may be raised by regulators.

Figure 1B:
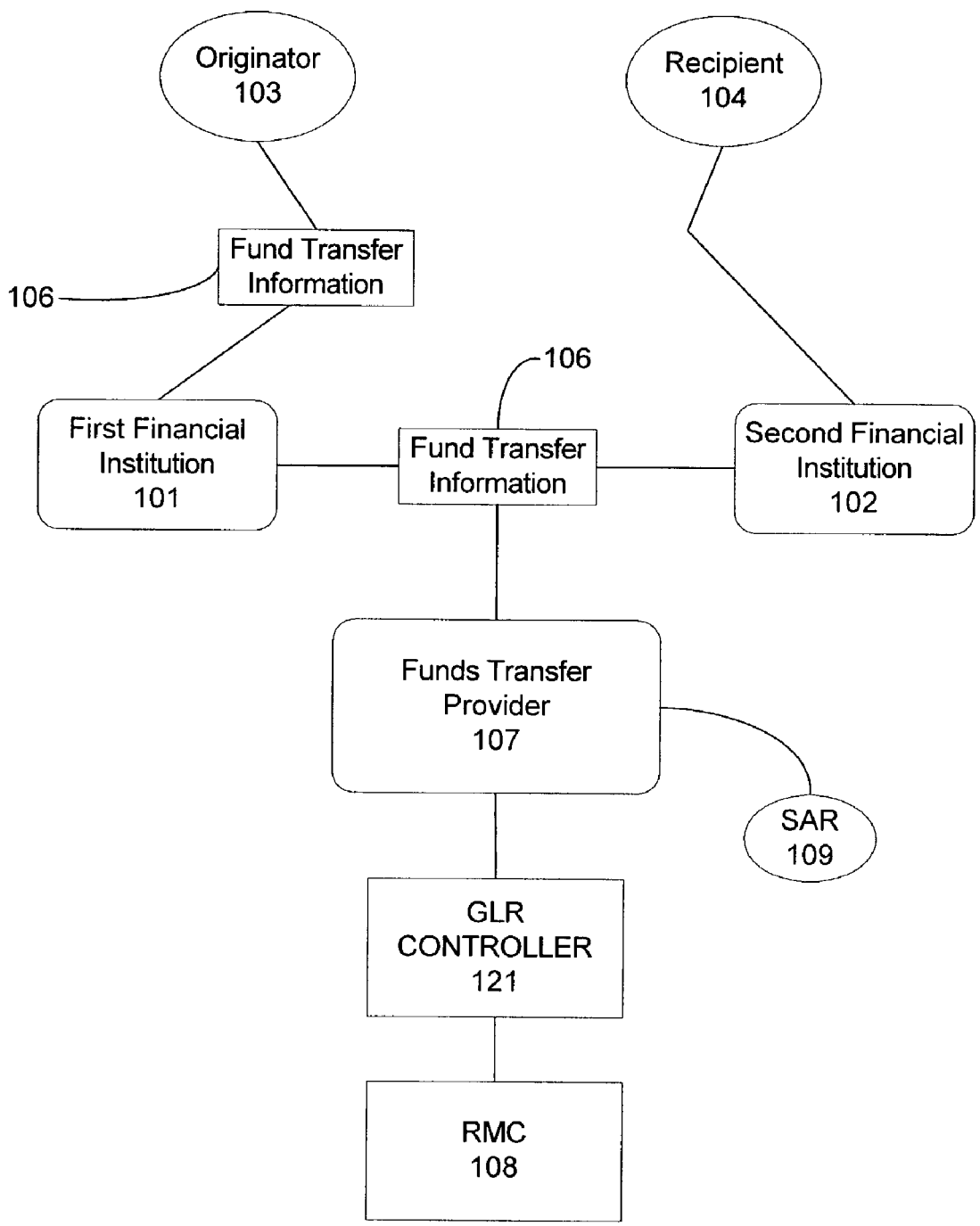
FIG. 1B is a block diagram of some implementations of the present invention which include funds transfer.

Referring now to FIG. 1B a block diagram of some exemplary embodiments of the present invention is illustrated. In the example illustrated, a GPA Controller 121 and an RMC 124 can facilitate management of Risk associated with a wire transfer or other electronic transfer of funds. Embodiments can include, an GPA Controller 121 linked to a Funds Transfer Provider 107 such that the GPA Controller 121 can receive informational data descriptive of a fund transfer 106 from one or more Financial Institutions 101-102 involved in the fund transfer. The GPA Controller 121 can provide an indication of the amount of Risk that is associated with the fund transfer.

The GPA Controller 121 can determine an amount of Risk associated with a fund transfer based upon internal processes and, in some embodiments, base upon informational artifacts and other related information provided by a RMC 124. The GPA Controller 121 and RMC 124 can evaluate the fund transfer information 106, including an assessment of a geo-political area associated with the originator 103 and a geo-political area associated with a recipient 104. The fund transfer information 106 can be assessed for indications of high Risk. The GPA Controller 121 can notify one or more Financial Institutions involved of any high Risk implications.

For example, a Financial Institution 101 may set up a compliance program that proscribes the Financial Institution 101 from conducting business, including a fund transfer, that involves a set of certain geo-political areas and requires additional due diligence for another set of geo-political areas. The GPA Controller 121 may automatically receive fund transfer information 106 from the Financial Institution 101 for each fund transfer the Financial Institution is going to execute. The GPA Controller 121 can assess the fund transfer information 106 to ascertain if any geo-political area involved is proscribed or requires additional due diligence. In addition, some embodiments of the present invention may conduct a RMC 124 search based upon the fund transfer information and incorporate the results of the RMC 124 search into feedback presented to the Financial Institution 101.

A transfer of funds can include a transaction, or series of transactions, which can begin with an originator's 103 payment order, made for the purpose of making payment to a recipient 104 who is a beneficiary of the order. A payment order can be issued by an originator's 103 bank or an intermediary bank (a first Financial Institution 101) intended to carry out the originator's 103 payment order. A funds transfer is completed by acceptance by the recipient's 104 bank (a second Financial Institution 102) of a payment order for the benefit of the beneficiary of the originator's payment order. Also within the scope of this invention are any other funds transfer including those made through an automated clearinghouse, an automated teller machine, or a point-of-sale system.

An originator 103 can include a sender of a first payment order in a funds transfer. An originator's bank can include a receiving bank to which a payment order of the originator 103 is issued if the originator 103 is not a bank or foreign bank, or the originator 103 if the originator 103 is a bank or foreign bank.

A payment order can include an instruction of a originator 103 to a receiving bank, which can be transmitted orally, electronically, or in writing, to pay, or to cause another bank or foreign bank to pay, a fixed or determinable amount of money to a beneficiary such that the receiving bank is to be reimbursed by debiting an account of, or otherwise receiving payment from the originator 103; and the instruction is transmitted by the originator 103 directly to the receiving Financial Institution 102 or to an agent, funds transfer system, or communication system for transmittal to the receiving Financial Institution 102.

A receiving Financial Institution 102 can include a bank or foreign bank to which a originator's 103 instruction is addressed. A receiving financial institution 102 can include a financial institution or foreign financial agency to which the originator's instruction is addressed. The term receiving financial institution can include a receiving bank. A recipient can include a person to be paid by the recipient's financial institution, and can also include a beneficiary a recipient's financial institution can include a financial institution or foreign financial agency identified in a transmittal order in which an account of the recipient is to be credited pursuant to the transmittal order or which otherwise is to make payment to the recipient if the order does not provide for payment to an account. The term recipient's financial institution can, in some embodiments, include a beneficiary's bank.

A transaction can include any transfer of pecuniary value, including, for example, a purchase, sale, loan, pledge, gift, transfer, delivery, or other disposition, and with respect to a financial institution includes a deposit, withdrawal, transfer between accounts, exchange of currency, loan, extension of credit, purchase or sale of any stock, bond, certificate of deposit, or other monetary instrument or investment security, purchase or redemption of any money order, payment or order for any money remittance or transfer, or any other payment, transfer, or delivery by, through, or to a financial institution, by whatever means effected. Similarly, a "transaction in currency" can include a transaction involving the physical transfer of currency from one person to another.

A transmittal of funds can include a series of transactions beginning with a transmitter's transmittal order, made for the purpose of making payment to a recipient of the order. The term can include a transmittal order issued by a transmitter's financial institution or an intermediary financial institution intended to carry out the transmitter's transmittal order. The term transmittal of funds includes a funds transfer. A transmittal of funds can be completed by acceptance by the recipient's financial institution of a transmittal order for the benefit of the recipient of the transmitter's transmittal order. A transmittal order can include a payment order and is an instruction of a originator to a receiving financial institution, transmitted orally, electronically, or in writing, to pay, or cause another financial institution or foreign financial agency to pay, a fixed or determinable amount of money to a recipient. Typically an instruction will not state a condition to payment to the recipient other than time of payment and the receiving financial institution is to be reimbursed by debiting an account of, or otherwise receiving payment from, the originator.

A transmitter can include the originator 103 of the first transmittal order in a transmittal of funds. Typically, the term transmitter includes an originator 103. A transmitter's financial institution 101 can include the receiving financial institution 101 to which the transmittal order of the transmitter is issued if the transmitter is not a financial institution 101 or foreign financial agency, or the transmitter if the transmitter is a financial institution 101 or foreign financial agency.

A transfer participant, including, an originator 103 and a recipient 104, can include, for example: an individual, a business, a corporation, a government entity, a charity, a church, or any other legal entity that may be involved in a transfer of funds.

The fund transfer information 106 can include: information identifying the transfer participants 103-104 involved; an account number or other identifier of an account supplying funds to be transferred; an account number or other identifier of a recipient account; an address and/or other identifying information of a transfer participant originating a fund transfer, an address and/or other identifying information of a transfer participant receiving funds via a fund transfer; a country or other jurisdiction from which the fund transfer originates; a country or other jurisdiction that is a destination of the fund transfer, any intermediary jurisdictions that may be involved with the fund transfer; a transaction identification number; any annotations included in the fund transfer and any other information related to the transfer of funds.

A Funds Transfer Provider 107 can include any entity with resources, facilities, authorizations or other factors required to effect an electronic transfer of funds. For example, a funds transfer institution can include a government entity, such as the U.S. Federal Reserve's Fedwire or a private institution, such as Western Union, CHIPS or SWIFT.

Some embodiments can include a Financial Institution 101-102 maintaining a record of each request, instruction or piece of advice received or given regarding any transaction resulting, or intended to result in the transfer of currency or other monetary instruments, funds, checks, investment securities, or credit. Some embodiments can also include a record of each advice, request, or instruction given to another Financial Institution 101-102 or other person located within or without the United States, regarding a transaction intended to result in the transfer of funds, currency or other monetary instruments, checks, investment securities, or credit.

Risk related criteria, which a Financial Institution 101-102 can record and forward to a RMC 124 can include informational data, such as, for example: an address or other indication of a geo-political area associated with the originator 103, transmitter, recipient 104, beneficiary, intermediary or other associated party; the name of the originator 103, transmitter, recipient 104, beneficiary, intermediary or other associated party an amount of a payment order; or other money transfer; an execution date of a payment order or other money transfer; payment instructions received from an originator or intermediary related to the payment order or other money transfer; the identity of the beneficiary's or recipient's bank; and any account numbers related to the transaction; any other specific identifier of an originator or beneficiary; if a payment order is made in person, any verification of the identity of the person placing the payment order. If it accepts a payment order, participant Financial Institution can obtain and retain data descriptive of the transaction, such as, for example, a record of the name and address of an originator, transmitter, intermediary, recipient and/or beneficiary, a type of identification reviewed for any person, a number associated with an identification document (e.g., driver's license), a record of the person's taxpayer identification number (e.g., social security or employer identification number, alien identification number or passport number) a country of issuance of an identifying document, or a notation in the record of the lack thereof.

Some embodiments can also include tracking each jurisdiction, country, sovereign area, nation or other political designation involved in each or any step of a transaction. For example, for any or each transaction, an origination and designation or recipient jurisdiction, as well as the jurisdiction of any intermediary jurisdiction, can be determined and forwarded to a GPA Controller 121 and a RMC 124 to conduct a risk management assessment.

In another aspect, some embodiments can include establishing and maintaining records related to any or all Transaction Parties, such as a transaction originator 103, transmitter, intermediary, recipient 104, beneficiary, or other related party. For example, for any payment or other transaction, if the proceeds are delivered in person to a beneficiary or its representative or agent, the beneficiary's bank can verify the identity of a person receiving the proceeds and obtain and retain a record of the name and address, the type of identification reviewed, the number of an identification document (e.g., driver's license), as well as a record of the person's taxpayer identification number (e.g., social security or employer identification number) or, if none, alien identification number or passport number and country of issuance, or a notation in the record of the lack thereof. If the beneficiary's bank has knowledge that the person receiving the proceeds is not the beneficiary, the beneficiary's bank can obtain and retain a record of the beneficiary's name and address, as well as the beneficiary's taxpayer identification number (e.g., social security or employer identification number) or, if none, alien identification number or passport number and country of issuance, if known by the person receiving the proceeds, or a notation in the record of the lack thereof.

Some embodiments of the present invention can closely follow terms and definitions of applicable law. Accordingly, embodiments can include an acceptance occurring when a receiving financial institution, other than the recipient's financial institution, accepts a transmittal order by executing the transmittal order. A recipient's financial institution can accept a transmittal order for example, by paying the recipient, notifying the recipient of the receipt of the order or by otherwise becoming obligated to carry out the order. Embodiments can also include an RMC search being performed on any person who transports, mails, ships or receives; is about to or attempts to transport, mail or ship; or causes the transportation, mailing, shipment or receipt of monetary instruments.

In another aspect, embodiments can be implemented in which a monetary instrument can include: currency; a traveler's check in any form; a negotiable instrument (including a personal check, business check, official bank check, cashier's check, third-party check, promissory note, and/or money order) any of which may be in bearer form, endorsed without restriction, made out to a fictitious payee, or otherwise in such form that title thereto passes upon delivery; an incomplete instrument, including a personal check, business check, official bank check, cashier's check, third-party check, promissory note; securities or stock in bearer form or otherwise in such form that title thereto passes upon delivery; or other form or vehicle which can act to transfer monetary value. In some forums a monetary instrument may not include a warehouse receipt or bill of lading, however such instruments can fall within the scope of this invention as it may be useful for Risk management to perform a RMC search information contained in any of the instruments listed routinely, periodically or upon request.

Some embodiments can also include currency defined as coin and paper money of the United States or of any other country that is designated as legal tender and that circulates and is customarily used and accepted as a medium of exchange in the country of issuance. Embodiments can therefore anticipate currency including U.S. silver certificates, U.S. notes and Federal Reserve notes. Currency can also include official foreign bank notes that are customarily used and accepted as a medium of exchange in a foreign country.

A beneficiary which, in some implementations, can be the subject of a RMC search can include a person to be paid by the beneficiary's bank, wherein the beneficiary's bank can include the bank or foreign bank identified in a payment order in which an account of the beneficiary is to be credited pursuant to an order or which otherwise is to make payment to the beneficiary if the order does not provide for payment to an account.

In some embodiments, a Risk Bearing Institution can incorporate a GPA Controller 121 as part of legal and regulatory oversight for various due diligence and know your customer obligations imposed by regulatory authorities. The RMC system can facilitate detection and reporting of potential violations of law, and in some embodiments, address the "suitability" of a financial transaction. Similarly, the RMC system can support a Risk Bearing Institution's effort to meet requirements regarding the maintenance of accurate books and records relating to conducted transactions.

Information gathered from the diversity of data sources can be aggregated into a searchable data storage structure. A source of information can also be received and stored. In some instances a subscriber may wish to receive information regarding the source of information received. Gathering data into an aggregate data structure, such as a data warehouse allows a RMC system to have the data readily available for processing a risk management search associated with a risk subject. Aggregated data 108 can also be scrubbed or otherwise enhanced.

In some embodiments of enhancing data, data scrubbing can be utilized to implement a data warehouse comprising the aggregate data structure. The data scrubbing takes information from multiple databases and stores it in a manner that gives faster, easier and more flexible access to key facts. Scrubbing can facilitate expedient access to accurate data commensurate with the critical business decisions that will be based upon the risk management assessment provided.

Various data scrubbing routines can be utilized to facilitate aggregation of risk variable related information. The routines can include programs capable of correcting a specific type of mistake, such as an incomprehensible address, or clean up a full spectrum of commonly found database flaws, such as field alignment that can pick up misplaced data and move it to a correct field or removing inconsistencies and inaccuracies from like data. Other scrubbing routines can be directed directly towards specific legal issues, such as money laundering or terrorist tracking activities.

For example, a scrubbing routine can be used to facilitate various different spelling of one name. In particular, spelling of names can be important when names have been translated from a foreign language into English. For example, some languages and alphabets, such as Arabic, have no vowels. Translations from Arabic to English can be very important for Risk Bearing Institutions seeking to be in compliance with lists supplied by the U.S. government that relate to terrorist activity and/or money laundering. A data scrubbing routine can facilitate risk variable searching for multiple spellings of an equivalent name or other important information. Such a routine can enhance the value of the aggregate data gathered and also help correct database flaws. Scrubbing routines can improve and expand data quality more efficiently than manual mending and also allow a subscriber to quantify best practices for regulatory purposes.

Retrieving information related to risk variables from the aggregated data is an operation with the goal to fulfill a given a request. In order to process request against a large document set of aggregated risk data with a response time acceptable to the user, it may be necessary to utilize an index based approach to facilitate acceptable response times. A direct string comparison based search may be unsuitable for the task.

An index file for a collection of documents can therefore be built upon receipt of the new data and prior to a query or other request. The index file can include a pointer to the document and also include important information contained in the documents the index points to. At query time, the RMC system can match the query against a representation of the documents, instead of the documents themselves. The RMC system can retrieve the documents referenced by the indexes that satisfy the request if the subscriber submits such a request. However it may not be necessary to retrieve the full document as index records may also contain the relevant information gleaned from the documents they point to. This allows the user to extract information of interest without having to read the source document.

At least two retrieval models can be utilized in fulfilling a search request: a) Boolean, in which the document set is partitioned in two disjoint parts: one fulfilling the query and one not fulfilling it, and b) relevance ranking based in which all the documents are considered relevant to a certain degree. Boolean logic models use exact matching, while relevance ranking models use fuzzy logic, vector space techniques (all documents and the query are considered vectors in a multi-dimensional space, where the shorter the distance between a document vector and the query vector, the more relevant is the document), neural networks, and probabilistic schema. In a relevance ranking model, low ranked elements may even not contain the query terms.

Augmenting data can include data mining techniques that use of sophisticated software to analyze and sift through the aggregated data stored in the warehouse using techniques such as mathematical modeling, statistical analysis, pattern recognition, rule based trends or other data analysis tools. In contrast to traditional systems that may have gathered and stored information in a flat file and regurgitated the stored information when requested, such as in a defined report related to a specific risk subject or other ad hoc access concerned with a particular query at hand, the present invention can provide risk related searching that adds a discovery dimension by returning results that human operator would find very labor and cognitively intense.

This discovery dimension supplied by the RMC system can be accomplished through the application of augmenting techniques, such as data mining applied to the risk related data that has been aggregated. Data mining can include the extraction of implicit, previously unknown and potentially useful information from the aggregated data. This type of extraction can include unlooked for correlations, patterns or trends. Other techniques that can be applied can include fuzzy logic and/or inductive reasoning tools.

For example, augmenting routines can include enhancing available data with routines designed to reveal hidden data. Revealing hidden data or adding data fields derived from existing data can be very useful to risk management. For example, is supplied data may not include an address for a person wishing to perform a financial transaction; however a known telephone number is available. Augmented data can include associating the telephone number with a known geographic area. The geographic area may be a political boundary, or coordinates, such as longitude and latitude coordinates, or global positioning coordinates. The geographic area identified can then be related to high risk or low risk areas.

Additional examples can include augmented data derived from a telephone number which an RMC 124 or GPA Controller 121 may associate with a particular geo-political area and which may in turn may be associated with a person, account or a Financial Transaction, as the case may be. Association with a geo-political area may via the telephone number may indicate a higher level of Risk.

Other embodiments can include the GPA Controller 121 or the RMC 124 highlighting inconsistencies relating to geo-political areas. For example, if a person in Europe wishes to perform a high value transaction denominated in a currency of a mid-eastern Arab nation through an African bank, augmented data may include a statistical analysis of how often such a transaction takes place on a global basis. The analysis may not place a value judgment on the proposed transaction, but would present the statistics for a compliance person to evaluate or for an automated process to flag as an elevated Risk situation.

A log or other stored history can be created by the RMC system and/or a GPA Controller 121, such that utilization of the present invention can mitigate adverse effects relating to a problematic Financial Transaction or geo-political area. Mitigation can be accomplished by demonstrating to regulatory bodies, shareholders, news media and other interested parties that corporate governance is being addressed through tangible risk management processes.

In some embodiments, the RMC system can also receive open inquiries, such as, for example, from subscriber personnel not necessarily associated with a particular transaction. An open query may, for example, search for information relating to an individual or circumstance not associated with a financial transaction and/or provide questions, historical data, world event information and other targeted information to facilitate a determination of risk associated with a risk subject, such as a query regarding an at risk entity's source of wealth or of particular funds involved with an account or transaction in consideration. Measures can also be put in place to insure that all such inquiries should be subject to prevailing law and contractual obligations.

A query can also be automatically generated from monitoring transactions being conducted by a transaction system 123. For example, an transaction system 123 can electronically scan transaction data for key words, entity names, geographic locales, or other pertinent data. Programmable software can be utilized to formulate a query according to suspect names or other pertinent data and run the query against a database maintained by the RMC system. Other methods can include voice queries via a telephone or other voice line, such as voice over internet, fax, electronic messaging, or other means of communication. A query can also include direct input into a GPA Controller 121 or RMC 124, such as through a graphical user interface (GUI) with input areas or prompts.

Prompts or other questions proffered by the GPA Controller 121 or the RMC 124 can also depend from previous information received. Information generally received, or received in response to the questions, can be input into the RMC system from which it can be utilized for real time risk assessment of Risks.

Some embodiments can also include an alert list containing names and/or terms of interest supplied to the GPA Controller 121 or RMC 124 by a subscriber or other source. Each list can be customized and specific to a particular user, or offered as a standard to any user. The RMC system can continually monitor data in its database via an alert query with key word, fuzzy logic or other search algorithms and transmit related informational data to the interested party. In this manner, ongoing diligence can be conducted. In the event that new information is uncovered by the alert query, the subscriber can be immediately notified, or notified according to a predetermined schedule. Appropriate action can be taken according to the information uncovered.

Some embodiments can also include a GPA Controller 121 or RMC 124 that can quantify risk due diligence by capturing and storing a record of information received and actions taken relating to a Financial Transaction. Once quantified, the due diligence data can be utilized for presentation, as appropriate, to regulatory bodies, shareholders, news media and/or other interested parties, such presentation may be useful to mitigate adverse effects relating to a problematic transaction. The data can demonstrate that corporate governance is being addressed through tangible risk management processes.

In some embodiments the RMC 124 can contain only information collected from publicly-available sources relevant for the detection and prevention of money laundering, fraud, corrupt practices, organized crime, activities subject to governmental sanctions or embargoes, or other similar activities that are the subject of national and/or global regulation. A user can use the database to identify the possibility that a given geo-political area or user is involved in such illegal activities and to monitor their transactions for indications of any activities involving such high Risk areas or persons.

Some embodiments can additionally include a finds transfer provider 107, a transaction system 123 a user device 122 or other device involved in geo-political area Risk Management generating a Suspicious activity Report 109, in compliance with government regulations.

Methods

Figure 2A:
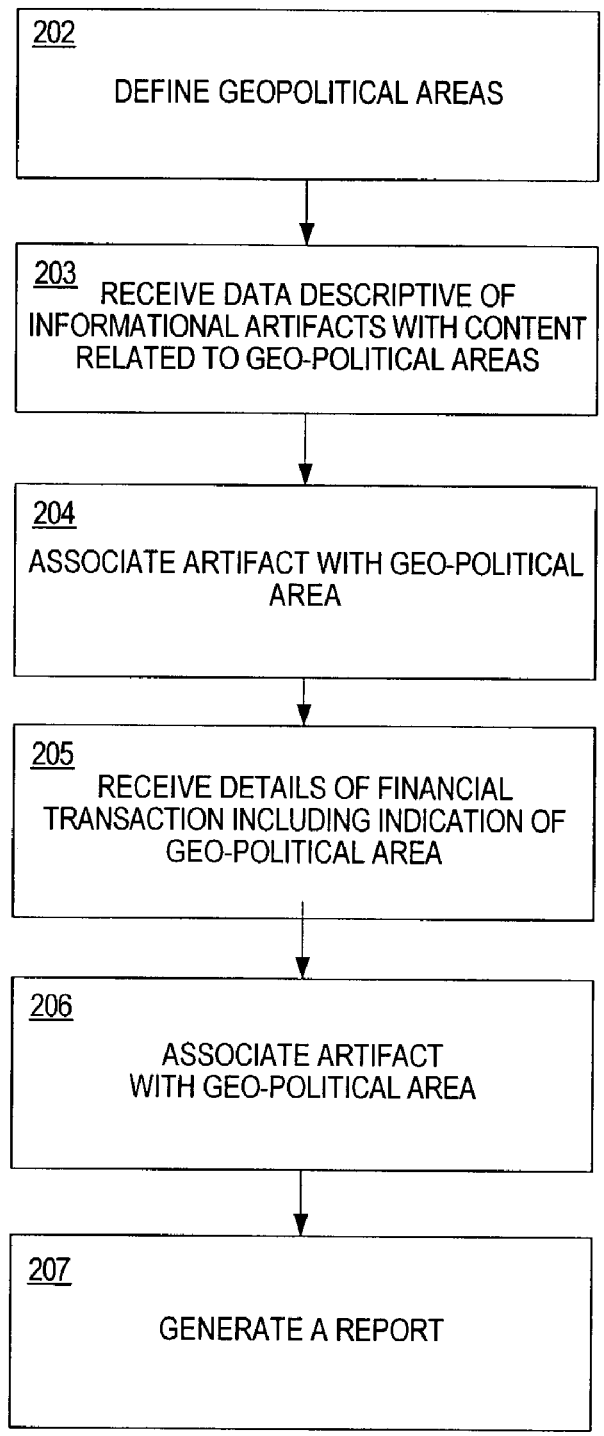
FIGS. 2A-2D illustrate flow charts of various methods according to some embodiments of the present invention.

Referring now to FIG. 2A, a flow diagram illustrates exemplary steps that can be implemented while practicing some embodiments of the present invention. At 202, one or more geo-political areas can be defined in the GPA Controller 121. The geo-political areas can be defined for example by creation of a data base listing each geo-political area and a description of each geo-political area. Each description can contain data that is appropriate for the type of geo-political area defined. For example, a political boundary maybe described according to internationally accepted borders, while a more local geo-political boundary may be defined according to postal code delineation or geographic delineation. At 203, data descriptive of informational artifacts with content related to one or more Risks can be received into the GPA Controller 121. The data descriptive of the informational artifact can include, for example, content of the artifact, a source of the artifact, a date and time of publication, a place of publication, any languages the artifact was made available in, where the artifact can be currently accessed, past credibility of artifacts originating from the source, or other details. At 204, one or more of the informational artifacts can be associated with one or more of the defined geo-political areas. Association can be accomplished, for example with well known data processing techniques for relating data, database search techniques, artificial intelligence, data enhancement, data scrubbing and other techniques known in the arts.

At 205, the GPA Controller 121 can receive data descriptive of details of a Financial Transaction. The data can include at least a description of one or more geographic areas associated with the Financial Transaction. Association with the transaction can be based upon the geo-political area of origination, the destination geo-political area, any intermediary geo-political areas, any geo-political areas to related to an originator 103, a recipient 104, a beneficiary, or other person or entity related to the Financial Transaction.

At 206, the GPA Controller 121 can associate the geo-political area with one or more artifacts that include data descriptive of one or more Risks. Association of the geo-political area with the data descriptive of risk variables can be accomplished using database search techniques, artificial intelligence, data enhancement, data scrubbing and other techniques known in the arts.

At 207, a report can be generated with data relating to the Financial Transaction, the geo-political areas involved. In various embodiments, the report can include other data, such as, for example, a risk quotient associated with the Financial Transaction and based at least partially upon the geo-political areas involved, data descriptive of the informational artifacts related to one or more of the geo-political areas associated with the Financial Transaction, an indication of an amount of risk, an indication for a course of action, or other data.

Figure 2B:
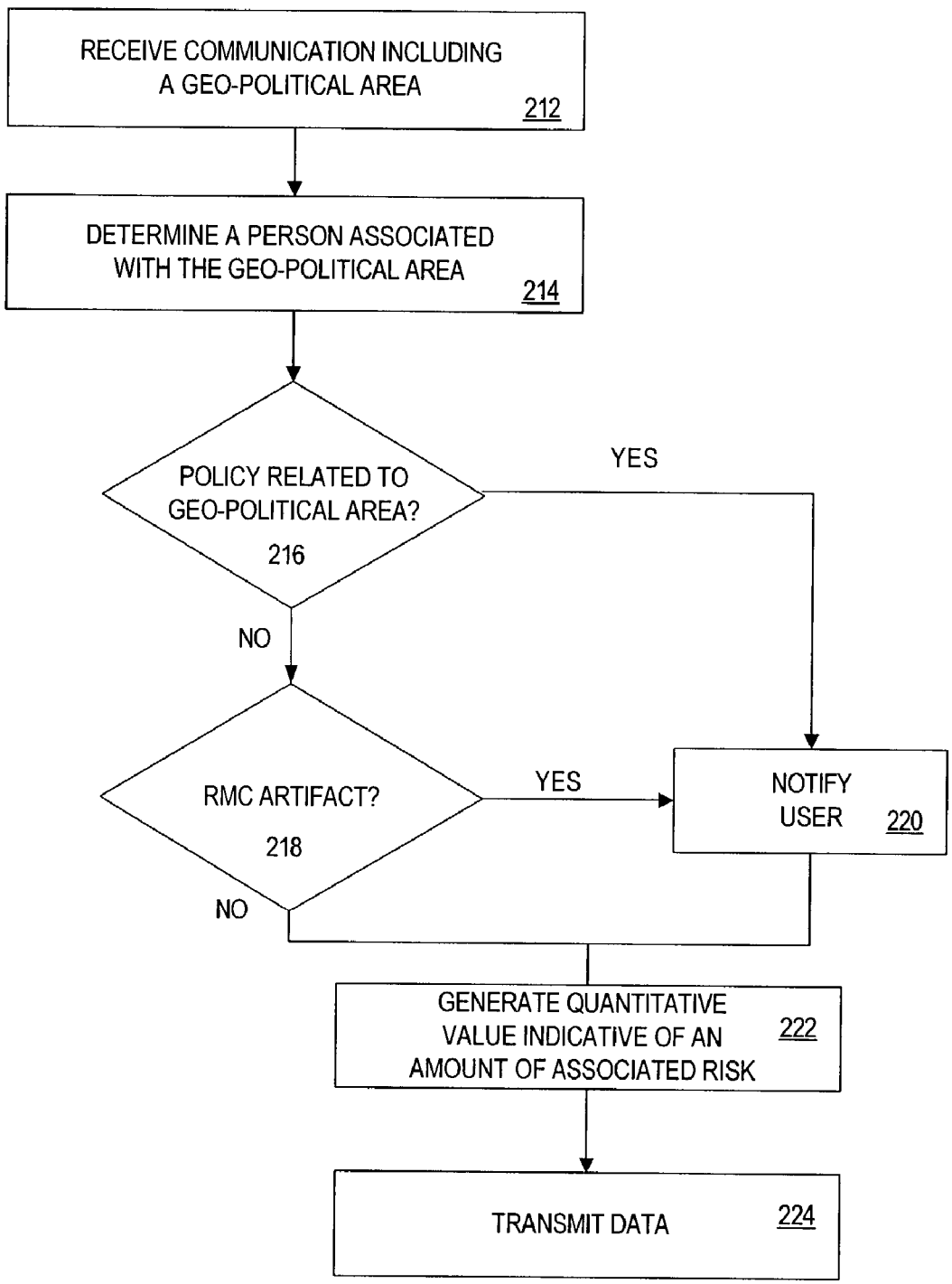

Referring now to FIG. 2B, additional exemplary steps that can be implemented in some embodiments of the present invention are illustrated. At 212, a communication can be received that includes a description of a geo-political area, such as a national jurisdiction, a postal code, local jurisdiction, street address or other indication of a geo-political area. The communication can include, for example, an electronic message transmitted via an electronic communications network, such as a computer network. Embodiments can include a communication that is generated, for example, as part of a data processing routine that processes data for some business objective. For example, incident to a funds transfer, a system that is utilized to effect a Financial Transaction that includes the transfer of funds can also execute an automated process that transmits an electronic communication to a GPA Controller 121. Other embodiments can include a communication that originates from direct user input, such as, for example, via input into a GUI, or via an e-mail message.

At 214, the GPA Controller 121 can determine if the GPA Controller 121 can associate a Person with the geo-political area, such as a street address. Some embodiments can include the GPA Controller 121 utilizing a RMC inquiry to associate a person with a geo-political area, such as a street address. Association with a geo-political area can include any record or artifact that links the person with the location, for example, an land owner, a tenant, a utility account, telephone account, a financial account, a tax bill, a drivers license address, tax rolls, employment records, credit card records, passport records, draft registration records, insurance records, law enforcement records, court records, Immigration and Naturalization Services records, other government records, retail or wholesale shipping records, school registration records, online (Internet) service registration, health services records, Post Office records, news story, news article, or any other data or artifact that can associate a Person with a particular address or geo-political area.

At 216, the GPA Controller 121 can determine if the GPA Controller 121 is programmed with a policy regarding any of the geo-political areas contained in the communication of step 212. If a policy does exist for one or more geo-political areas, then the GPA Controller 121 can notify a user at 220.

At 218, a risk management clearinghouse search can be conducted to search for artifacts that may contain information indicative of an amount of risk associated with the geo-political area, a person associated with the geo-political area, or both.

For example, a geo-political area may include a street address, and a utility account to supply electricity to a particular street address may include one or more account holder names. A RMC 124 search can be conducted that searches for information and artifacts that are associated with the street address and the account holder names. Any information or artifacts that are uncovered by the RMC 124 search may be useful in assessing an amount of risk that might be associated with the account holder names and therefore with the geo-political area that includes the street address.

At 224, the GPA Controller 121 can generate a quantitative value that is indicative of an amount of risk associated with the geo-political area. For example, in some embodiments, a quantitative value can include a risk quotient based upon risk variables identified in an artifact discovered during the risk management clearinghouse search. The risk quotient can be calculated, for example, by assigning a weight to a particular risk variable and determining a numeric measure of risk associated with an actual value ascertained for the risk variable. In other embodiments, a quantitative value may simply include a level of due diligence that should be conducted regarding a particular account or Financial Transaction, or even that a particular Financial Transaction should be avoided until certain issues identified by the GPA Controller 121 policy indicator or the RMC 124 search have been resolved.

At 226, the GPA Controller 121 can transmit data conveying the results of the previous steps 212-222. The data can include a report with such results, including, in some embodiments an indication of an amount of Risk associated with the geo-political area, an amount of Risk associated with a particular Financial Transaction, artifacts returned by a RMC 124 search, a policy associated with a particular geo-political area, a risk quotient, an image of any artifacts associated with the geo-political area, values for one or more risk variables associated with the geo-political area, names of persons associated with the geographic address, or other data.

Figure 2C:
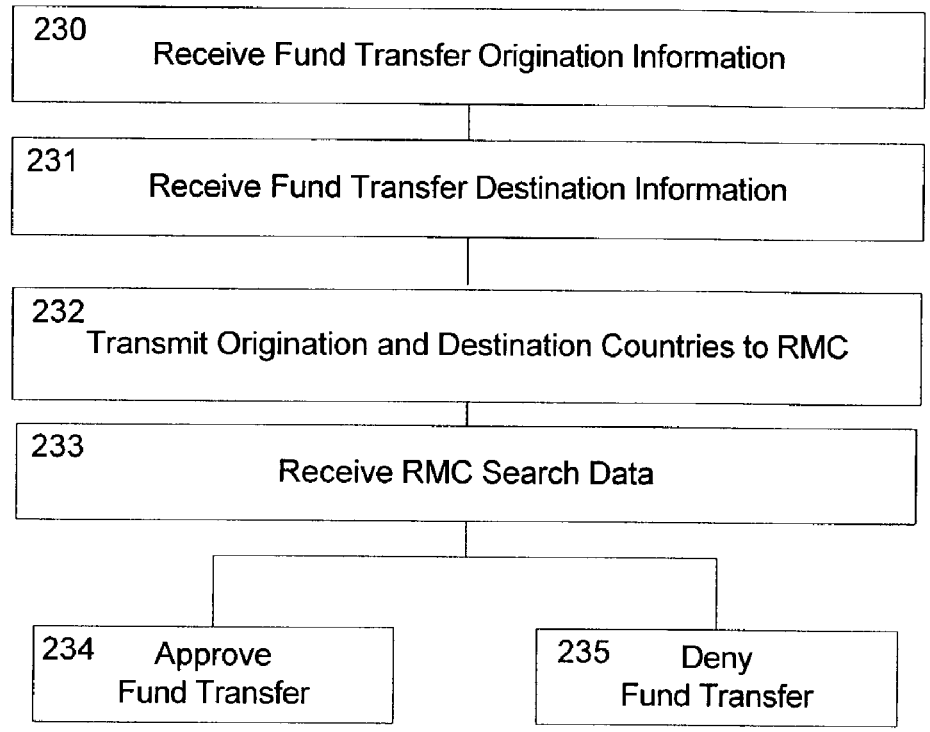

Referring now to FIG. 2C, additional steps that can be taken to implement various embodiments of the present invention are illustrated. At 230, a GPA Controller 121 can receive details of a Financial Transaction that, in some embodiments can include fund transfer origination information including an indication of a origination geo-political area. At 231, the GPA Controller 121 can receive destination information including an indication of a destination geo-political area. In some cases, if appropriate, the GPA Controller 121 can also receive an indication of any intermediate geo-political areas. As discussed above, the GPA Controller 121 will typically receive the information from a transaction system 123, although the GPA Controller 121 may also receive them directly from a user device 122.

At 232, the GPA Controller 121, or in some embodiments, the transaction system 123, can transmit, or otherwise convey, related geo-political areas, including, for example, the origination and destination countries to the RMC 124. In some embodiments the RMC system can provide an alert upon receipt of any new RMC system data relating to a previously screened geo-political area or other risk subject. Different embodiments can also include information in the RMC system being accessed in various ways, such as, for example: system to system inquires involving single or batch screening requests, individual inquiries (submitted electronically, by facsimile, or by phone) for smaller screening requests, or through a web-based interface supporting an individual lookup service.

At 233, RMC 124 search data can be received. Embodiments can include receiving the RMC 124 search data into the transaction system 123 or the GPA Controller 121. At 234 and 235, direction can be generated related to a Financial Transaction, such as a fund transfer. For example, at 234 the direction can include an indication of approval for the fund transfer d at 235 the direction can include a denial of the fund transfer. The indications can be based upon a quantitative Risk evaluation, such as for example, a risk quotient, or a policy related to geo-political area. As such, the direction can be generated by the transaction system 123 or the GPA Controller 121.

Figure 2D:
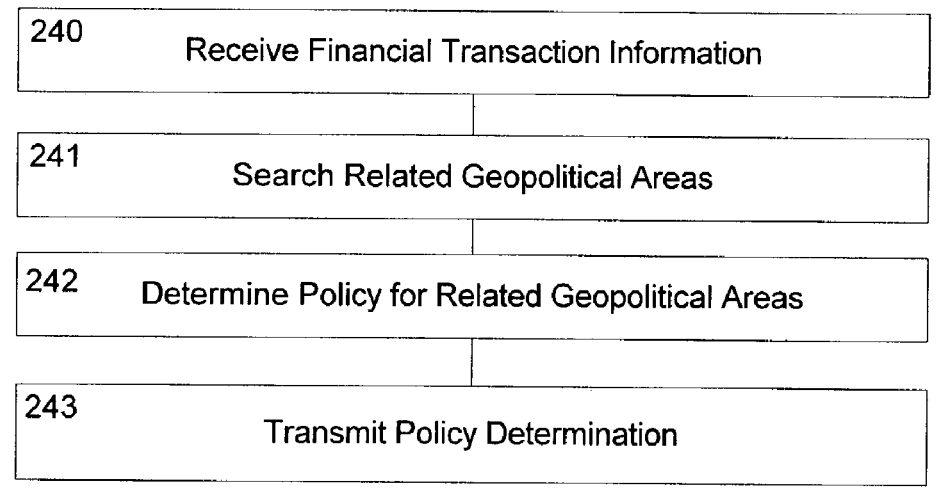

Referring now to FIG. 2D, basic steps are illustrated that can be performed to implement some embodiments of the present invention. At 240, a GPA Controller 121 can receive information descriptive of details of a Financial Transaction, such as, for example, a wire transfer of funds. At 241, the GPA Controller 121 can search related geo-political areas, such as, for example, origination, intermediate and destination jurisdictions. At 242 the GPA Controller 121 can determine if there are any predetermined policies related to the related geo-political areas, and at 243 the GPA Controller 121 can transmit, or otherwise convey a related policy to an appropriate destination, such as, for example a transaction system 123 or a user device 122.

Obviously other steps can also be incorporated into process implementing the present invention. For example, a user device 122 or a transaction system 123 can receive an indication of how to proceed in response to submitting details relating to a particular Financial Transaction, such as, for example,) proceed with the financial transaction, b) proceed with the financial transaction and gather additional information regarding the entities involved; c) do not proceed with the financial transaction until notified pending gathering of additional information; and d) do not proceed with the financial transaction.

Systems

Figure 3:
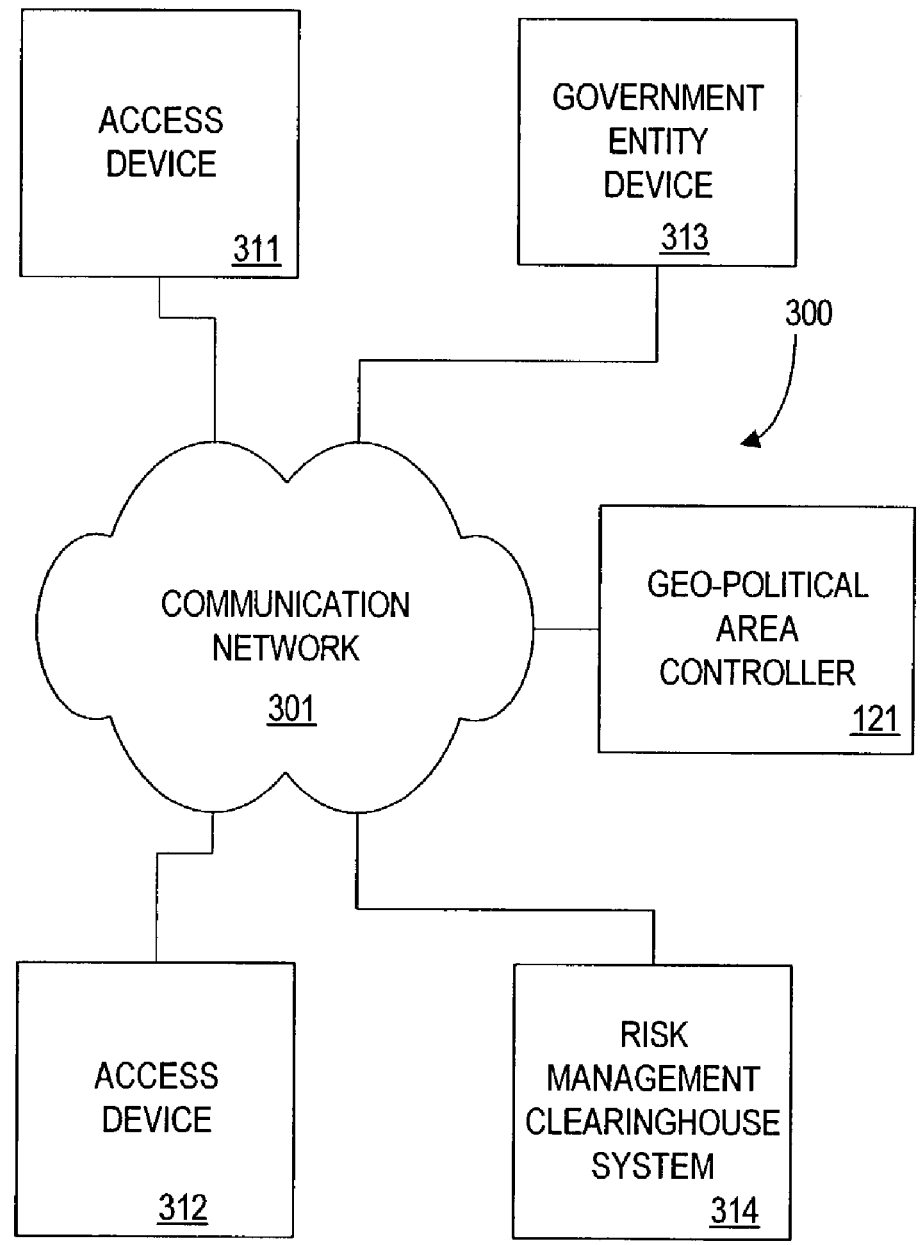
FIG. 3 is a block diagram overview of a communication system according to some embodiments of the present invention.

Referring now to FIG. 3, a network diagram illustrating some embodiments of the present invention is shown 300. An automated GPA Controller 121 can include a computerized server accessible via a distributed network 301 such as the Internet, or a private network. An automated transaction processing system 123 can also include a computerized server accessible via the distributed network 301. A user can use a computerized system or network access device 122 to receive, input, transmit or view information processed in the GPA Controller 121, transaction processing system 123, a peer device, or other network access device 122. A protocol, such as, for example, the transmission control protocol internet protocol (TCP/IP) can be utilized to provide consistency and reliability.

A system access device 122 can communicate with the GPA Controller 121 or transaction processing system 123 to access data and programs stored at the respective servers. A system access device 122 may interact with the GPA Controller 121 or transaction processing system 123 as if the servers were a single entity in the network 300. However, the GPA Controller 121 and transaction processing system 123 may include multiple processing and database sub-systems, such as cooperative or redundant processing and/or database servers that can be geographically dispersed throughout the network 300.

Figure 4:
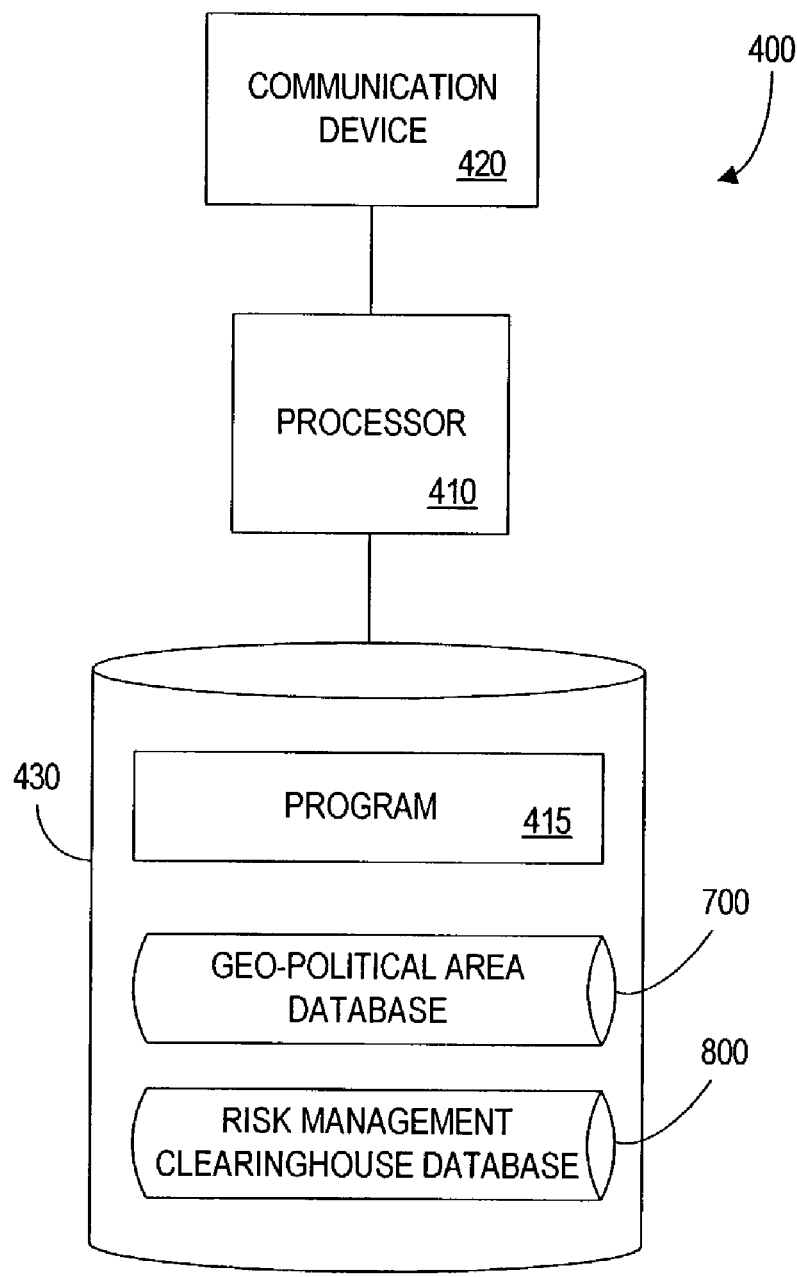
FIG. 4 is a block diagram of a communication controller according to an embodiment of the present invention.

A server utilized in a transaction processing system 123 and GPA Controller 121 can include a processor, memory and a user input device, such as a keyboard and/or mouse, and a user output device, such as a display screen and/or printer, as further detailed in FIG. 4. Any server can also include one or more databases (700, 800 in FIG. 4), storing data relating to a geo-political area, a Financial transaction, transaction participant, informational artifact, associated risks, or other pertinent information. Information relating to and included in geo-political related risk management can be aggregated into a searchable data storage structure. Gathering data into an aggregate data structure 700, 800, such as a data warehouse, allows a server 123, 314 to have the data readily available for processing a risk management search associated with a Financial Transaction. Aggregated data 108, 304 can also be scrubbed or otherwise enhanced to aid in searching.

Typically, an access device 122 will access a GPA Controller 121 using client software executed at the system access device 122. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from a server to the system access device 122 and executed at the system access device 122 as part of a GPA Controller 121. Other implementations include proprietary software installed from a computer readable medium, such as a CD ROM. The invention may therefore be implemented in digital electronic circuitry, computer hardware, firmware, software, or in combinations of the above. Apparatus of the invention may therefore be implemented in a computer program product tangibly embodied in a machine-readable storage device for execution by a programmable processor and method steps of the invention may be performed by a programmable processor executing a program of instructions to perform functions of the invention by operating on input data and generating output.

In some embodiments, data contained in a database can be scrubbed or otherwise enhanced. Data scrubbing can be utilized to store information in a manner that gives efficient access to pertinent data and facilitate expedient access to data.

Controller

FIG. 4 illustrates a controller 400 that can be descriptive of a computer that can be utilized as a server or access device 121-123 shown, for example, in FIG. 3, according to some embodiments of the present invention. The GPA Controller 121 comprises a processor 410, such as one or more processors, coupled to a communication device 420 configured to communicate via a communication network (not shown in FIG. 4). The communication device 420 may be used to communicate, for example, with one or more network access devices 122.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 can store a program 430 for controlling the processor 410. The processor 410 performs instructions of the program 430, and thereby operates in accordance with the present invention. For example, the processor 410 may receive information descriptive of geopolitical areas and associate those areas with predefined policies and/or transmit the information to an RMC.

The storage device 430 can store geo-political risk management related data in a database 700, and other data 800 as needed. The illustration and accompanying description of the database presented herein is exemplary, and any number of other database arrangements can be employed besides those suggested by the figures.

User Interfaces

Figure 5:
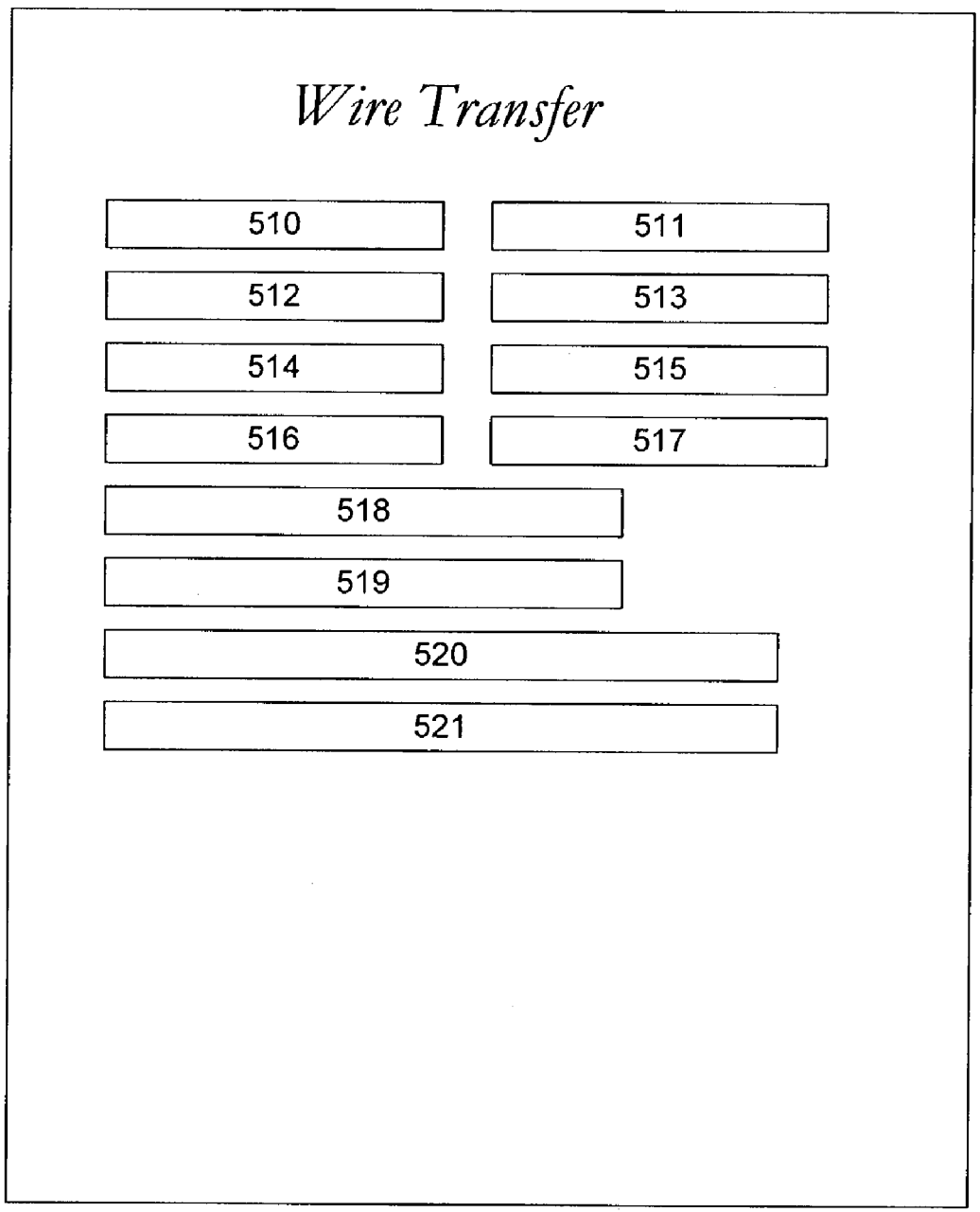
FIG. 5 illustrates a user interface that can be utilized with some embodiments of the present invention.
Figure 6:
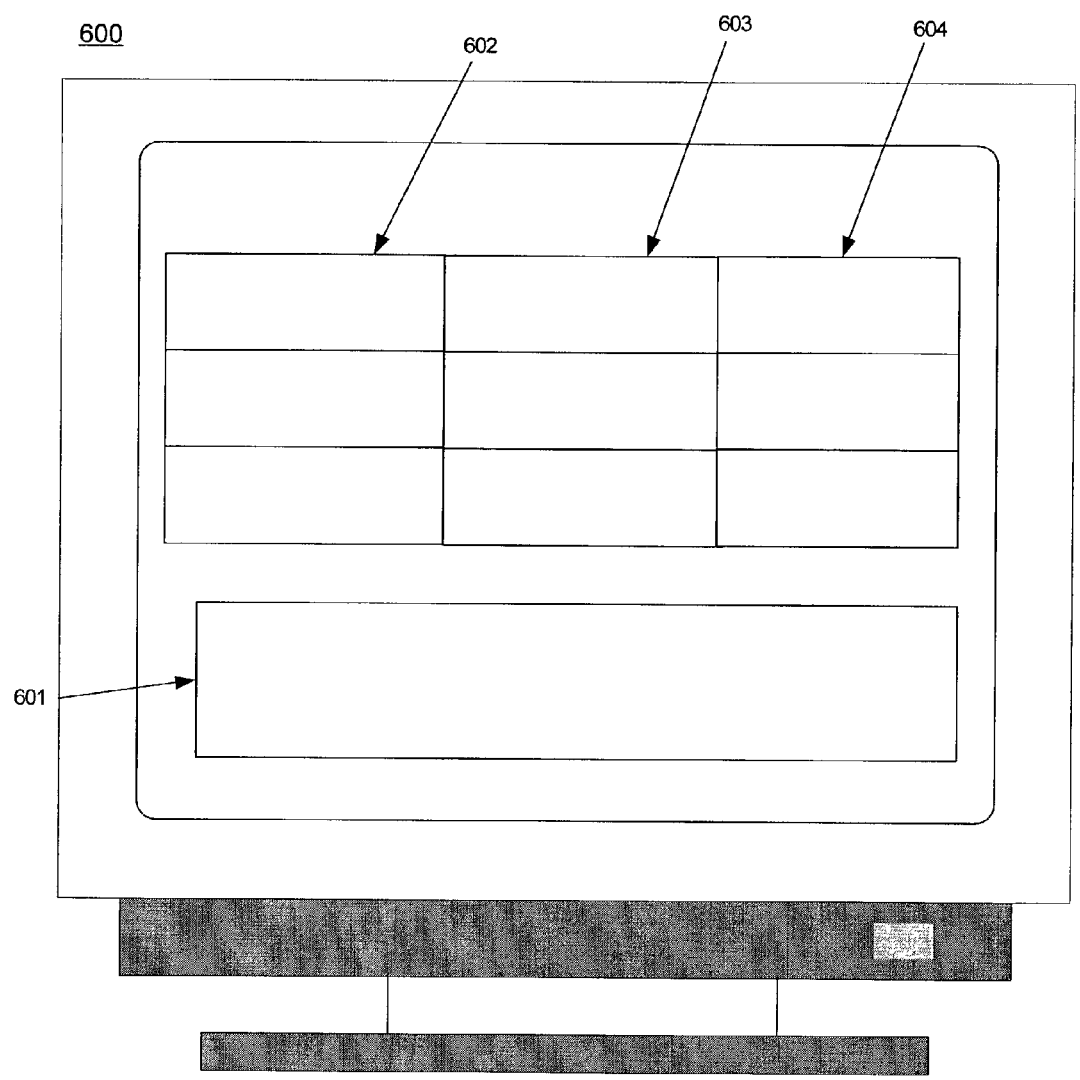
FIG. 6 illustrates a graphical user interface that can be utilized with some embodiments of the present invention.

FIGS. 5-6 illustrate aspects of some embodiments of user interfaces. Referring now to FIG. 5, an interface can be utilized in some embodiments relating to wire transfer can include interactive areas for inputting, displaying and editing data representative of: a transaction participant name 510, a transaction participant address or other indication of a geo-political area or designation associated with the transaction participant 511, a beneficiary 512, a tax identification number 513, a type of identification document associated with the transaction 514, a country of issuance of an identification document 515, an originator citizenship 516, a recipient or beneficiary citizenship 517, origination geo-political area 518, intermediary geo-political area 519, destination geo-political area 520, or other related data 521.

Referring now to FIG. 6, an interactive graphical user interface is illustrated, which can accommodate those features described in FIG. 5 or additional functionality, such as, for example, an area to input one or more geo-political areas 602, one more policies related to each geo-political area 603, a threshold risk quotients that may trigger a suggested action 604 and an area for receiving instructions that can be conveyed and which relate to one or more particular geo-political areas 601.

Geographic Address Information Database

Referring to FIG. 7, a table represents the geo-political area information database 700 that may be stored in conjunction with a controller 500 according to some embodiments of the present invention. The table includes entries identifying geographic locations or other geo-political areas to which communications may be facilitated 702. The table also defines a artifact information 704, a source 706 for each of the entries and a participant name 708. The information in the geo-political area information database 700 may be created and updated, for example, by the controller 600 and/or a third-party service (e.g., an RMC service provider).

Risk Management Database

Figure 8:
FIG. 8 is a tabular representation of a portion of a risk management database according to some embodiments of the present invention.

Referring to FIG. 8, a table represents the risk management database 800 that may be stored at a controller 500 according to an embodiment of the present invention. The table includes one or more entries identifying requests that have been received and/or processed by the controller 500. The table also defines fields 802, 804, 806, 808 for each of the entries. The fields specify: a government list 802, a media publication 804, a geographic address 806, and a transaction participant name 808. The information in the risk management database 800 may be created and updated, for example, as the controller 600 receives information.

Other information may be stored in the risk management database 800 in addition to the information illustrated in FIG. 8. For example, the risk management database 800 may indicate a date, a time, and/or a location associated with risk management (e.g., a time period during which a high risk individual was associated with a geographic address) and/or a reason why a particular geographic address was associated with a high risk (e.g., indicating a list or other source indicating a risk associated with an individual.

Additional Embodiments

Although many of the embodiments described herein are associated with a controller 500 facilitating communications, according to another embodiment communication devices instead communicate with each other to perform this function (e.g., a group communication devices may utilize peer-to-peer communications to facilitate communications via destination identifiers).

Moreover, the embodiments described herein are associated with a controller 500 performing a number of functions. According to other embodiments, some or all of these functions can instead be performed by any of the other devices described herein. For example, a communication device or a user device may perform some or all of the functions described with respect to the controller 500.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims. Further, although the foregoing embodiments were described for clarity, those skilled in the art will understand how to make any changes, if necessary, to the above-described apparatus and methods to accommodate these and other embodiments and applications.

What is claimed is:

1. A computer implemented method for managing regulatory and reputational risk, the method comprising the steps of:
   receiving into a computer system data descriptive of informational artifacts with content related to at least one of reputational and regulatory risk;
   receiving into the computer system transaction data descriptive of a financial transaction, wherein the transaction data comprises an indication of at least one defined geo-political area associated with the financial transaction;
   scrubbing by the computer system the received informational artifacts data and financial transaction data
   obtaining information by the computer system regarding one or more geo-political areas;
   determining a transactional jurisdiction associated with the scrubbed financial transaction data based on the at least one geo-political area;
   retrieving by the computer system a predetermined policy related to the at least one geo-political area associated with the financial transaction data for transmission to an appropriate destination;
   associating by the computer system at least one informational artifact related to at least one of reputational and regulatory risk with the at least one geo-political area associated with the financial transaction based at least in part on the determined transactional jurisdiction and the retrieved policy; and
generating by the computer system a report comprising data descriptive of the informational artifacts associated with the at least one geo-political area, the transactional jurisdiction and the retrieved policy associated with the financial transaction.

2. The method of claim 1 wherein the details of the financial transaction comprise identification data of one or more persons, organizations or entities associated with the transaction and the method additionally comprises the step of associating the one or more persons, organizations or entities with one or more defined geo-political areas such that the at least one defined geo-political area associated with the financial transaction is associated via the one or more persons, organizations or entities.

3. The method of claim 1 additionally comprising the step of:
generating in the computer system a risk quotient indicative of a quantitative amount of at least one of: reputational risk and regulatory risk, associated with the transaction, wherein the risk quotient is based upon the geo-political area associated with the transaction.

4. The method of claim 3 additionally comprising the step of generating a suggested action based upon at least one of: the risk quotient and content of informational artifact.

5. The method of claim 4 wherein the suggested action comprises requiring additional details descriptive of the financial transaction.

6. The method of claim 4 wherein the suggested action comprises completing a financial transaction.

7. The method of claim 4 wherein the suggested action comprises filing a suspicious activity report.

8. The method of claim 1 wherein the financial transaction comprises a wire transfer of funds.

9. The method of claim 1 wherein the indication of at least one defined geo-political area comprises at least one of: a street address and a mailing address.

10. The method of claim 1 wherein the indication of the at least one geo-political area comprises at least one of: a global positioning system designation, a tax map designation, and a latitude and longitude coordinate.

11. The method of claim 1 wherein the indication of the at least one geo-political area comprises a defined proximity surrounding at least one of: a street address, a global positioning designation and a latitude and longitude coordinate.

12. The method of claim 1 wherein the indication of the at least one geo-political area comprises a political boundary.

13. The method of claim 1 wherein the indication of at the least one geo-political area comprises a national boundary.

14. The method of claim 1 additionally comprising indicating a course of action comprising at least one of: a) proceed with the financial transaction, b) proceed with the financial transaction and gather additional information regarding the entities involved; c) do not proceed with the financial transaction until notified pending gathering of additional information; and d) do not proceed with the financial transaction.

15. A computer implemented method for managing regulatory and reputational risk comprising the steps of:
receiving into a computer system data descriptive of informational artifacts with content related to at least one of reputational and regulatory risk;
associating by the computer system one or more of the informational artifacts with one or more of the geo-political areas;
receiving into the computer system details of a financial transaction, wherein the details comprise an indication of at least one geo-political area associated with the financial transaction;
scrubbing by the computer system the received informational artifacts data and financial transaction data;
obtaining information by the computer system regarding one or more geo-political areas from a database;
determining a transactional jurisdiction associated with the scrubbed financial transaction data based on the at least one geo-political area;
retrieving by the computer system a predetermined policy related to the at least one geo-political area associated with the financial transaction data for transmission to an appropriate destination;
associating by the computer system at least one informational artifact related to at least one of reputational and regulatory risk with the at least one defined geo-political area associated with the financial transaction based at least in part on the determined transactional jurisdiction and the retrieved policy; and
generating by the computer system a report comprising data descriptive of the informational artifacts associated with the at least one geo-political area, the transactional jurisdiction and the retrieved policy associated with the financial transaction.

16. A computerized system for managing risk associated with a correspondent account, the system comprising:
a computer server including a processor, accessible with a system access device via a communications network; and
a server-side storage element storing processor-executable instructions, the processor-executable instructions facilitating the computer server to:
receive into a computer system data descriptive of informational artifacts with content related to at least one of reputational and regulatory risk;
receive into the computer system details of a financial transaction, wherein the details comprise an indication of at least one defined geo-political area associated with the financial transaction;
scrub by the computer system the received informational artifacts data and financial transaction data;
obtain information via the computer system regarding multiple geo-political areas from a database;
associate one or more of the informational artifacts with one or more of the geo-political areas;
determine a transactional jurisdiction associated with the scrubbed financial transaction data based on the at least one geo-political area;
retrieve via the computer system a predetermined policy related to the at least one geo-political area associated with the financial transaction data for transmission to an appropriate destination;
associate by the computer system at least one informational artifact related to at least one of reputational and regulatory risk with the at least one geo-political area associated with the financial transaction based at least in part on the determined transactional jurisdiction and the retrieved policy; and
generate by the computer system a report comprising data descriptive of the informational artifacts associated with the at least one defined geo-political area, the transactional jurisdiction and the retrieved policy associated with the financial transaction.

17. A tangible computer-readable storage medium storing processor executable program code, the processor executable program code comprising instructions executable to:
receive into a computer system data descriptive of informational artifacts with content related to at least one of reputational and regulatory risk;
receive into the computer system details of a financial transaction, wherein the details comprise an indication of at least one defined geo-political area associated with the financial transaction;

scrub by the computer system the received informational artifacts data and financial transaction data;
obtain information via the computer system regarding multiple geo-political areas from a database;
associate one or more of the informational artifacts with one or more of the geo-political areas;
determine a transactional jurisdiction associated with the scrubbed financial transaction data based on the at least one geo-political area;
retrieve via the computer system a predetermined policy related to the at least one geo-political area associated with the financial transaction data for transmission to an appropriate destination;

associate by the computer system at least one informational artifact related to at least one of reputational and regulatory risk with the at least one geo-political area associated with the financial transaction based at least in part on the determined transactional jurisdiction and the retrieved policy; and
generate by the computer system a report comprising data descriptive of the informational artifacts associated with the at least one defined geo-political area, the transactional jurisdiction and the retrieved policy associated with the financial transaction.

* * * * *